US 8,268,056 B2

(12) United States Patent
Lee et al.

(10) Patent No.: US 8,268,056 B2
(45) Date of Patent: Sep. 18, 2012

(54) METHOD FOR MANUFACTURING SEPARATOR, SEPARATOR MANUFACTURED BY THE METHOD AND METHOD FOR MANUFACTURING ELECTROCHEMICAL DEVICE INCLUDING THE SEPARATOR

(75) Inventors: Joo-Sung Lee, Daejeon (KR); Jang-Hyuk Hong, Daejeon (KR); Jong-Hun Kim, Daejeon (KR); Bo-Kyung Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/331,057

(22) Filed: Dec. 20, 2011

(65) Prior Publication Data
US 2012/0090758 A1    Apr. 19, 2012

Related U.S. Application Data

(63) Continuation of application No. PCT/KR2011/001370, filed on Feb. 25, 2011.

(30) Foreign Application Priority Data

Feb. 25, 2010   (KR) .................. 10-2010-0016989
Feb. 24, 2011   (KR) .................. 10-2011-0016506

(51) Int. Cl.
*B01D 53/22*    (2006.01)
*H01M 10/04*   (2006.01)
*H01M 2/16*    (2006.01)
*B05D 5/12*     (2006.01)

(52) U.S. Cl. ....... 96/11; 96/4; 95/45; 429/129; 429/247; 429/251; 427/58; 427/258; 427/336; 427/372.2

(58) Field of Classification Search .............. 96/4, 11; 95/45; 429/129, 247, 251; 427/58, 207.1, 427/258, 336, 337, 352, 372.2
See application file for complete search history.

(56) References Cited

U.S. PATENT DOCUMENTS

| 6,497,780 | B1 * | 12/2002 | Carlson ................. 156/230 |
| 2008/0292968 | A1 * | 11/2008 | Lee et al. ................ 429/247 |
| 2009/0155678 | A1 * | 6/2009 | Less et al. ............... 429/247 |
| 2009/0246613 | A1 | 10/2009 | Park et al. |
| 2010/0178567 | A1 * | 7/2010 | Hauser et al. ............. 429/247 |
| 2011/0171535 | A1 * | 7/2011 | Ohinshi et al. ............ 429/247 |

FOREIGN PATENT DOCUMENTS

JP       09082312 A     3/1997
JP     2001148243 A     5/2001

(Continued)

*Primary Examiner* — Jason M Greene
(74) *Attorney, Agent, or Firm* — Lerner, David, Littenberg, Krumholz & Mentlik, LLP

(57) ABSTRACT

Disclosed is a method for manufacturing a separator. The method includes (S1) preparing a porous planar substrate having a plurality of pores, (S2) preparing a slurry containing inorganic particles dispersed therein and a polymer solution including a first binder polymer and a second binder polymer in a solvent, and sequentially coating the slurry on the porous substrate through a first discharge hole and a non-solvent incapable of dissolving the second binder polymer on the slurry through a second discharge hole adjacent to the first discharge hole, and (S3) simultaneously removing the solvent and the non-solvent by drying. According to the method, a separator with good bindability to electrodes can be manufactured in an easy manner. In addition, problems associated with the separation of inorganic particles in the course of manufacturing an electrochemical device can be avoided.

20 Claims, 1 Drawing Sheet

FOREIGN PATENT DOCUMENTS

| | | |
|---|---|---|
| JP | 2007095668 A | 4/2007 |
| JP | 2009535780 A | 10/2009 |
| JP | 2009266464 A | 11/2009 |
| KR | 20060020904 A | 3/2006 |
| KR | 20070000231 U | 2/2007 |
| KR | 100754746 B1 | 9/2007 |
| KR | 20090083854 A | 8/2009 |
| WO | 2009081594 A1 | 7/2009 |

* cited by examiner

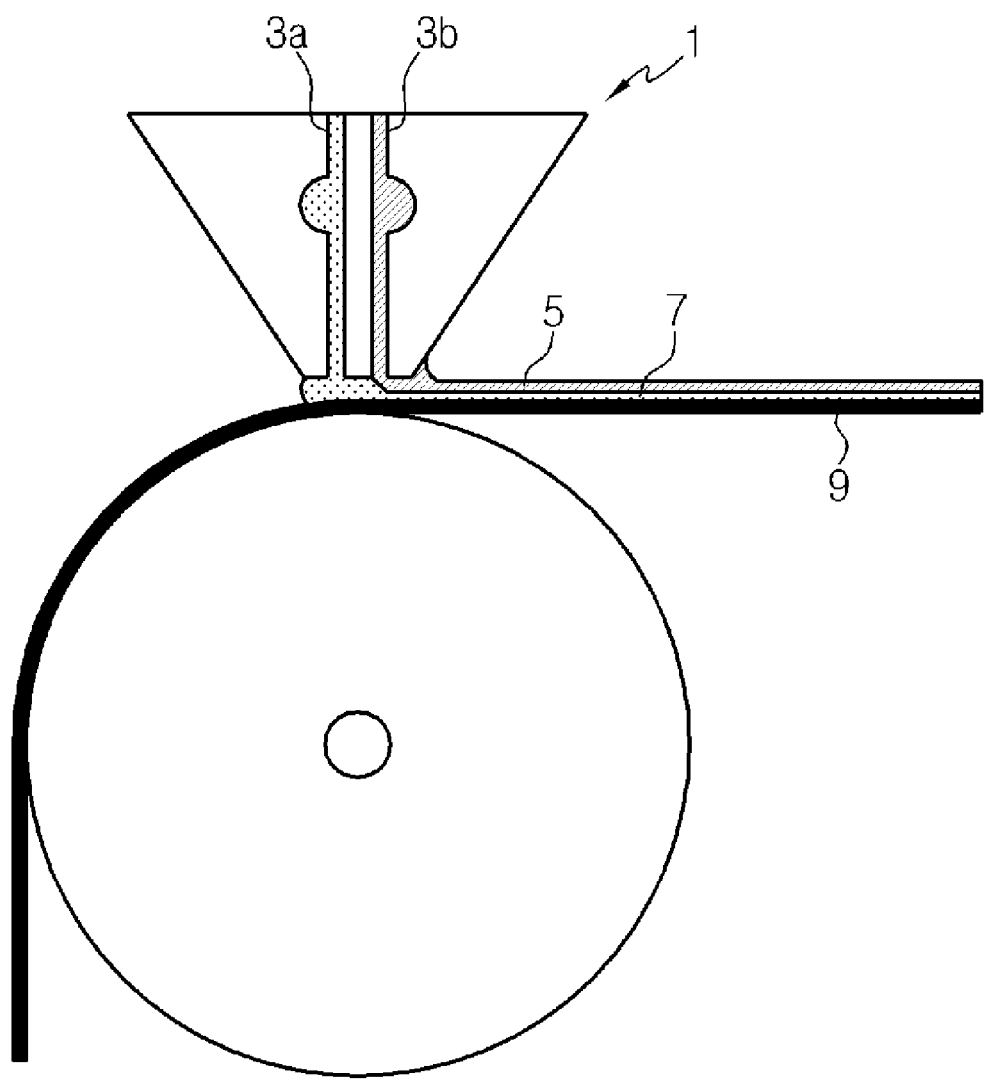

METHOD FOR MANUFACTURING SEPARATOR, SEPARATOR MANUFACTURED BY THE METHOD AND METHOD FOR MANUFACTURING ELECTROCHEMICAL DEVICE INCLUDING THE SEPARATOR

CROSS-REFERENCE TO RELATED APPLICATION

This application is a continuation of International Application No. PCT/KR2011/001370 filed Feb. 25, 2011, which claims priority under 35 USC 119(a) to Korean Patent Application Nos. 10-2010-0016989 and 10-2011-0016506 filed in the Republic of Korea on Feb. 25, 2010 and Feb. 24, 2011, respectively, the entire contents of which are incorporated herein by reference.

TECHNICAL FIELD

The present invention relates to a method for manufacturing a separator for an electrochemical device such as a lithium secondary battery, a separator manufactured by the method, and a method for manufacturing an electrochemical device including the separator. More specifically, the present invention relates to a method for manufacturing a separator in which an organic-inorganic composite porous layer composed of a mixture of inorganic particles and binder polymers is formed on a porous substrate, a separator manufactured by the method, and a method for manufacturing an electrochemical device including the separator.

BACKGROUND ART

Recently, there has been increasing interest in energy storage technologies. As the application fields of energy storage technologies have been extended to mobile phones, camcorders, notebook computers and even electric cars, efforts have increasingly been made towards the research and development of electrochemical devices. Under these circumstances, secondary batteries capable of repeatedly charging and discharging, in particular, have attracted considerable attention as the most promising electrochemical devices. In recent years, extensive research and development has been conducted to design new electrodes and batteries for the purpose of improving capacity density and specific energy of the batteries.

Many secondary batteries are currently available. Lithium secondary batteries developed in the early 1990's have drawn particular attention due to their advantages of higher operating voltages and much higher energy densities than conventional aqueous electrolyte-based batteries such as Ni—MH batteries, Ni—Cd batteries, and $H_2SO_4$—Pb batteries. However, such lithium ion batteries suffer from safety problems, such as fire or explosion, when encountered with the use of organic electrolytes and have a disadvantage in that they are complicated to manufacture. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause short circuits between a cathode and an anode.

In order to solve the above safety problems of electrochemical devices, a separator has been suggested in which a mixture of inorganic particles and a binder polymer is coated on at least one surface of a highly porous substrate to form a porous organic-inorganic composite coating layer. For example, Korean Unexamined Patent Publication No. 10-2007-0000231 discloses a technique concerning a separator including a porous substrate and a porous coating layer formed on the porous substrate wherein the porous coating layer is composed of a mixture of inorganic particles and a binder polymer.

The inorganic particles present in the porous coating layer serve as spacers that help to maintain a physical shape of the porous coating layer to inhibit the porous substrate from thermal shrinkage when an electrochemical device overheats or to prevent short circuits between both electrodes of the electrochemical device when thermal runaway takes place. Interstitial volumes present between the inorganic particles form fine pores.

The presence of a sufficient amount of the inorganic particles above a predetermined level is a prerequisite for the above-mentioned advantageous functions of the organic-inorganic composite porous coating layer formed on the porous substrate. However, an increase in the content of the inorganic particles, i.e. a decrease in the content of the binder polymer, reduces the bindability of the separator to the electrodes and tends to cause separation of the inorganic particles from the porous coating layer when stress occurs during manufacturing (e.g., winding) of the electrochemical device or when the separator comes into contact with an external member. The reduced bindability of the separator to the electrodes leads to a deterioration in the performance of the electrochemical device. The separated inorganic particles act as local defects of the electrochemical device, giving a negative influence on the safety of the electrochemical device.

As a result of extensive investigation to solve the problems of the prior art separators, the present applicant has succeeded in manufacturing a separator which employs a binder polymer having a particular structure (Korean Patent No. 0754746). There still exists a need in the art to develop a method for manufacturing a separator with improved performance.

DISCLOSURE

Technical Problem

The present invention is designed to solve the problems of the prior art, and therefore it is an object of the present invention to provide a method for easily manufacturing a separator with good bindability to electrodes by which problems associated with the separation of inorganic particles in the course of manufacturing an electrochemical device can be avoided. It is another object of the invention to provide a separator manufactured by the method. It is still another object of the invention to provide a method for manufacturing an electrochemical device including the separator.

Technical Solution

According to an aspect of the present invention, there is provided a method for manufacturing a separator which includes: (S1) preparing a porous planar substrate having a plurality of pores; (S2) preparing a slurry containing inorganic particles dispersed therein and a polymer solution including a first binder polymer and a second binder polymer in a solvent, and sequentially coating the slurry on the porous substrate through a first discharge hole and a non-solvent incapable of dissolving the second binder polymer on the slurry through a second discharge hole adjacent to the first discharge hole; and (S3) simultaneously removing the solvent and the non-solvent by drying.

The porous substrate is preferably a porous polyolefin membrane and preferably has a thickness of 1 to 100 µm.

The inorganic particles preferably have an average particle diameter of 0.001 to 10 µm. The inorganic particles may be selected from the group consisting of inorganic particles having a dielectric constant of at least 5, inorganic particles having the ability to transport lithium ions, and mixtures thereof.

The first binder polymer is preferably a polymer having cyano groups. As the polymer having cyano groups, there may be mentioned, for example, cyanoethylpullulan, cyanoethyl polyvinyl alcohol, cyanoethyl cellulose, polycyanoacrylate or cyanoethyl sucrose.

Preferably, the solvent used in the preparation of the slurry has a solubility parameter difference of 5.0 Mpa$^{0.5}$ or less from those of the first binder polymer and the second binder polymer. Acetone, N,N-dimethylacetamide, N,N-dimethylformamide, N-methyl-2-pyrrolidone or methyl ethyl ketone is more preferably used as the solvent.

As the second binder polymer, there may be mentioned, for example, polyvinylidene fluoride-co-hexafluoropropylene, polyvinylidene fluoride-co-trichloroethylene or polymethyl methacrylate. The difference in solubility parameter between the non-solvent and the second binder polymer is preferably 8.0 Mpa$^{0.5}$ or more. Particularly, water, methanol or ethanol is more preferably used as the non-solvent.

According to another aspect of the present invention, there is provided a separator manufactured by the method. The separator has a structure in which a porous coating layer composed of inorganic particles and a mixture of binder polymers is formed on the surface of a porous substrate.

According to yet another aspect of the present invention, there is provided a method for manufacturing an electrochemical device by interposing the separator between a cathode and an anode, followed by lamination. An electrochemical device manufactured by the method may be, for example, a lithium secondary battery or a supercapacitor device.

Advantageous Effects

The separator manufactured by the method of the present invention exhibits the following advantageous effects.

First, the non-solvent sprayed on the slurry promotes phase separation of the second binder polymer to allow a larger amount of the second binder polymer to be distributed on the surface of the porous coating layer. This distribution enhances the bindability of the separator to electrodes, thus facilitating lamination between the separator and the electrodes. In addition, problems associated with the separation of the inorganic particles can be avoided.

Second, a sufficiently high bonding strength between the separator and electrodes is ensured, so that the content of the inorganic particles in the porous coating layer can be increased, resulting in a further improvement in the stability of the separator.

DESCRIPTION OF DRAWINGS

Other objects and aspects of the present invention will become apparent from the following descriptions of the embodiments with reference to the accompanying drawing in which:

FIG. 1 is a view schematically illustrating the process of a method for manufacturing a separator according to an embodiment of the present invention.

Best Mode

Hereinafter, preferred embodiments of the present invention will be described in detail with reference to the accompanying drawing. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

The present invention provides a method for manufacturing a separator. The method of the present invention will now be described in detail.

First, a porous planar substrate having a plurality of pores is prepared (S1).

The porous substrate may be any porous planar substrate commonly used in electrochemical devices. Examples of such porous planar substrates include various porous polymer membranes and non-woven fabrics. As the porous polymer membranes, there can be used, for example, porous polyolefin membranes used in separators for electrochemical devices, particularly, lithium secondary batteries. The non-woven fabrics may be, for example, those composed of polyethylene phthalate fibers. The material or shape of the porous substrate may vary according to intended purposes. Examples of materials suitable for the porous polyolefin membranes include polyethylene polymers, such as high density polyethylene, linear low density polyethylene, low density polyethylene and ultrahigh molecular weight polyethylene, polypropylene, polybutylene and polypentene. These polyolefins may be used alone or as a mixture thereof. Examples of materials suitable for the non-woven fabrics include polyolefins and polymers having higher heat resistance than polyolefins. The thickness of the porous substrate is preferably from 1 to 100 µm, more preferably from 5 to 50 µm, but is not particularly limited to this range. The pore size and porosity of the porous substrate are preferably from 0.001 to 50 µm and 10 to 95%, respectively, but are not particularly limited to these ranges.

Subsequently, a slurry containing inorganic particles dispersed therein and a polymer solution including a first binder polymer and a second binder polymer in a solvent is prepared, and a non-solvent incapable of dissolving the second binder polymer is prepared. The slurry and the non-solvent are sequentially coated on the porous substrate through a first discharge hole and a second discharge hole adjacent to the first discharge hole, respectively (S2).

Hereinafter, an explanation will be given of the constituent components of the slurry used in this step.

The inorganic particles are not specifically limited so long as they are electrochemically stable. In other words, the inorganic particles can be used without particular limitation in the present invention if they do not undergo oxidation and/or reduction in an operating voltage range applied to an electrochemical device (for example, 0-5 V for $Li/Li^+$). In particular, a high dielectric constant of the inorganic particles can contribute to an increase in the degree of dissociation of a salt (e.g., a lithium salt) in a liquid electrolyte to improve the ionic conductivity of the electrolyte.

For these reasons, it is preferred that the inorganic particles have a high dielectric constant of at least 5, preferably at least 10. Non-limiting examples of inorganic particles having a dielectric constant of at least 5 include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC particles. These inorganic particles may be used alone or as a mixture of two or more kinds thereof.

The inorganic particles may be those having the ability to transport lithium ions, that is, those containing lithium atoms and having the ability to transfer lithium ions without storing the lithium. Non-limiting examples of inorganic particles having the ability to transport lithium ions include lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles such as $14Li_2O$—$9Al_2O_3$—$38TiO_2$—$39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4$—$Li_2S$—$SiS_2$ particles, and $P_2S_5$ type glass ($Li_xP_yS_z$, $0<x<3$, $0<y<3$, $0<z<7$) particles such as $LiI$—$Li_2S$—$P_2S_5$ particles. These inorganic particles may be used alone or as a mixture of two or more kinds thereof.

There is no particular restriction on the average particle diameter of the inorganic particles. The average particle diameter of the inorganic particles is preferably limited to the range of 0.001 to 10 μm. Within this range, a uniform thickness and an optimal porosity of the coating layer can be obtained. An average particle diameter of less than 0.001 μm may cause deterioration of dispersibility. Meanwhile, an average particle diameter exceeding 10 μm may increase the thickness of the coating layer.

The first binder polymer is not specifically limited but is preferably a polymer having cyano groups. Examples of such polymers having cyano groups include cyanoethylpullulan, cyanoethyl polyvinyl alcohol, cyanoethyl cellulose, polycyanoacrylate and cyanoethyl sucrose. These polymers having cyano groups may be used alone or as a mixture of two or more thereof. Polyacrylamide-co-acrylate is preferably used as the first binder polymer.

The second binder polymer may be selected from the group consisting of polyvinylidene fluoride-co-hexafluoropropylene, polyvinylidene fluoride-co-trichloroethylene, polymethyl methacrylate and mixtures thereof.

The weight ratio of the first binder polymer to the second binder polymer is in the range of 75:25 to 10:90. Within this range, the objects of the present invention can be suitably achieved. The ratio of the weight of the inorganic particles to the weight of the binder polymers (i.e. the sum of the weights of the first and second binder polymers) is preferably in the range of 50:50 to 99:1 and more preferably 70:30 to 95:5. If the inorganic particles are present in an amount of less than 50% by weight (i.e. the binder polymers are present in a relatively large amount), the pore size and porosity of the porous coating layer may be reduced. Meanwhile, if the inorganic particles are present in an amount exceeding 99% by weight, the peeling resistance of the porous coating layer may be deteriorated.

The solvent used in the preparation of the slurry dissolves both the first binder polymer and the second binder polymer. The solvent is preferably one whose solubility parameter has a difference of 5.0 $Mpa^{0.5}$ or less from those of the first binder polymer and the second binder polymer. Examples of solvents suitable for use in the preparation of the slurry may include acetone, N,N-dimethylacetamide, N,N-dimethylformamide, N-methyl-2-pyrrolidone and methyl ethyl ketone. These solvents may be used alone or as a mixture thereof.

The slurry may be prepared by dissolving the first binder polymer and the second binder polymer in the solvent, adding the inorganic particles to the solution, and dispersing the inorganic particles in the solution. The inorganic particles may be crushed to a proper size before addition to the solution of the binder polymers. Preferably, the inorganic particles are added to the solution of the binder polymers and are then dispersed in the solution while being crushed by a suitable technique such as ball milling.

The slurry thus prepared is put into a coating machine and is coated on the porous substrate through a first discharge hole of the coating machine. Taking into consideration the functions of the coating layer and the suitability of the coating layer for a high-capacity battery, it is preferred to adjust the amount of the slurry loaded on the porous substrate such that the porous coating layer has a basis weight ranging from 5 to 20 $g/m^2$.

A non-solvent is sequentially coated on the slurry through a second discharge hole adjacent to the first discharge hole. The term 'sequential coating' as used herein is intended to mean that the non-solvent is coated on the slurry before the solvent of the slurry is removed by drying. The term 'non-solvent' as used herein refers to a solvent that does not dissolve the second binder polymer. The non-solvent is preferably one whose solubility parameter has a difference of 8.0 $Mpa^{0.5}$ or more from that of the second binder polymer. Particularly, for example, water, methanol or ethanol is more preferred as the non-solvent.

The sequential coating (S2) may be carried out by various techniques such as slot die coating. A preferred embodiment of the sequential coating is illustrated in FIG. 1.

Referring to FIG. 1, a die 1 having a first slot 3a and a second slot 3b is used to carry out the sequential coating (S2). The slurry 7, which contains the inorganic particles dispersed therein and a polymer solution including the first and second binder polymers in the solvent, is discharged through the first slot 3a and is coated on the porous substrate 9. The non-solvent 5 is discharged through the second slot 3b and is coated on the slurry 7. That is, the slurry 7 is coated on the porous substrate 9 supplied onto a rotating roller and the non-solvent 5 is sequentially coated on the slurry 7.

The non-solvent sprayed on the slurry coating layer promotes phase separation of the second binder polymer in the slurry to allow a larger amount of the second binder polymer to be distributed on the surface of the slurry coating layer. This distribution enhances the bindability of a separator to be manufactured after subsequent drying (S3) to electrodes, thus facilitating lamination between the separator and the electrodes and avoiding problems associated with the separation of the inorganic particles. In addition, a sufficiently high bonding strength between the separator and electrodes is ensured, so that the content of the inorganic particles in the porous coating layer can be increased, resulting in a further improvement in the stability of the separator.

Finally, the solvent of the slurry coated on the porous substrate and the non-solvent are simultaneously removed by drying (S3). This simultaneous removal allows a larger amount of the second binder polymer to be present on the outermost surface of the porous coating layer. That is, the surface portion of the porous coating layer contains a larger number of the second binder polymer molecules than the underlying portion thereof. This distribution enhances the bonding strength between the separator and electrodes.

The slurry coating layer may be dried before spraying with the non-solvent, unlike in the method of the present invention. In this case, however, the function of the non-solvent on the second binder polymer cannot be expected.

The present invention also provides a separator manufactured by the method. The separator includes a porous substrate and a porous coating layer formed on the porous substrate. The porous substrate and the porous coating layer are the same as those explained earlier. In the porous coating layer, the binder polymers attach (that is, fixedly connect) the inorganic particles to each other so as to maintain a state in which the inorganic particles are bound to each other. It is preferred to maintain a state in which the porous coating layer is bound to the porous substrate by the binder polymers. Thus, the inorganic particles are in contact with each other in the porous coating layer. It is preferred that interstitial volumes created between the inorganic particles in contact with each other become pores of the porous coating layer. At this time, the size of the interstitial volumes is equal to or smaller than the average particle diameter of the inorganic particles.

The present invention also provides a method for manufacturing an electrochemical device by interposing the separator between a cathode and an anode, followed by lamination. An electrochemical device manufactured by the method may be any device in which electrochemical reactions occur, and specific examples thereof include all kinds of primary batteries, secondary batteries, fuel cells, solar cells, and capacitors such as supercapacitor devices. Particularly preferred are lithium secondary batteries, including lithium metal secondary batteries, lithium ion secondary batteries, lithium polymer secondary batteries and lithium ion polymer secondary batteries.

There is no particular restriction on the production method of a cathode and an anode to be applied together with the separator of the present invention. Each of the electrodes can be produced by binding an electrode active material to an electrode current collector by suitable methods known in the art. The cathode active material may be any of those that are commonly used in cathodes of conventional electrochemical devices. Non-limiting examples of particularly preferred cathode active materials include lithium manganese oxides, lithium cobalt oxides, lithium nickel oxides, lithium iron oxides and lithium composite oxides thereof. The anode active material may be any of those that are commonly used in anodes of conventional electrochemical devices. Non-limiting examples of particularly preferred anode active materials include lithium, lithium alloys, and lithium intercalation materials such as carbon, petroleum coke, activated carbon, graphite and other carbonaceous materials. Non-limiting examples of cathode current collectors suitable for use in the electrochemical device of the present invention include aluminum foils, nickel foils and combinations thereof. Non-limiting examples of anode current collectors suitable for use in the electrochemical device of the present invention include copper foils, gold foils, nickel foils, copper alloy foils and combinations thereof.

The electrochemical device of the present invention can use an electrolyte consisting of a salt and an organic solvent capable of dissolving or dissociating the salt. The salt has a structure represented by $A^+B^-$ wherein $A^+$ is an alkali metal cation such as $Li^+$, $Na^+$, $K^+$ or a combination thereof and B is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof.

The electrolyte may be injected in any suitable step during manufacturing of the electrochemical device depending on the manufacturing processes and desired physical properties of a final product. Specifically, the electrolyte may be injected before battery assembly or in the final step of battery assembly.

Mode for Invention

Hereinafter, the present invention will be explained in detail with reference to embodiments. The embodiments of the present invention, however, may take several other forms, and the scope of the invention should not be construed as being limited to the following examples. The embodiments of the present invention are provided to more fully explain the present invention to those having ordinary knowledge in the art to which the present invention pertains.

Example 1

A polymer mixture of cyanoethylpullulan as a first binder polymer and polyvinylidene fluoride-co-hexafluoropropylene (PVdF—HFP) as a second binder polymer in a weight ratio of 2:10 was dissolved in acetone at 50° C. for at least about 12 hours to prepare a polymer solution. A barium titanate ($BaTiO_3$) powder was added to the polymer solution until the weight ratio of the polymer mixture to the inorganic powder reached 10:90. The inorganic particles were crushed and dispersed using a ball mill for at least 12 hours to prepare a slurry. The inorganic particles of the slurry had an average particle diameter of 600 nm.

The slurry and distilled water as a non-solvent for the second binder polymer were sequentially coated on one surface of a 12 μm thick porous polyethylene terephthalate membrane (porosity 45%) through the slot die illustrated in FIG. 1. The wet thicknesses of the slurry and the non-solvent were adjusted to 75 μm and 10 μm, respectively.

Subsequently, the coated substrate was passed through a dryer to remove the solvent and the non-solvent, completing the manufacture of a separator including a 12.5 μm thick porous coating layer.

The separator was found to have a Gurley value of 387.3 sec/100 mL.

Another separator was manufactured as described above. The two separators were laminated to each other at 100° C.

The laminate was found to have a bonding strength of 12.58 gf/cm, implying good bindability to electrodes.

Example 2

A separator was manufactured in the same manner as in Example 1, except that the kind of the non-solvent was changed to a mixture of distilled water and methanol (5:5 (v/v)). The separator was found to have a Gurley value of 367.6 sec/100 mL and a bonding strength of 9.81 gf/cm.

Example 3

A separator was manufactured in the same manner as in Example 1, except that the kind of the first binder polymer was changed to polycyanoacrylate. The separator was found to have a Gurley value of 375.4 sec/100 mL and a bonding strength of 13.94 gf/cm.

Example 4

A separator was manufactured in the same manner as in Example 1, except that the kind of the first binder polymer was changed to polyacrylamide-co-acrylate. The separator was found to have a Gurley value of 349.1 sec/100 mL and a bonding strength of 10.47 gf/cm.

Comparative Example 1

A separator was manufactured in the same manner as in Example 1, except that the kind of the non-solvent was changed to acetone.

Although the Gurley value of the separator was in a good level (391.5 sec/100 mL), the bonding strength of the separator was much lower (2.19 gf/cm) than the bonding strengths of the separators manufactured in Examples 1-4.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method for manufacturing a separator, comprising:
   (S1) preparing a porous planar substrate having a plurality of pores;
   (S2) preparing a slurry containing inorganic particles dispersed therein and a polymer solution comprising a first binder polymer and a second binder polymer in a solvent, and sequentially coating the slurry on the porous substrate through a first discharge hole and a non-solvent incapable of dissolving the second binder polymer on the slurry through a second discharge hole adjacent to the first discharge hole; and
   (S3) simultaneously removing the solvent and the non-solvent by drying.

2. The method according to claim 1, wherein the porous substrate is a porous polyolefin membrane.

3. The method according to claim 1, wherein the porous substrate has a thickness of 1 to 100 μm.

4. The method according to claim 1, wherein the inorganic particles have an average particle diameter of 0.001 to 10 μm.

5. The method according to claim 1, wherein the inorganic particles are selected from the group consisting of inorganic particles having a dielectric constant of at least 5, inorganic particles having the ability to transport lithium ions, and mixtures thereof.

6. The method according to claim 5, wherein the inorganic particles having a dielectric constant of at least 5 are selected from the group consisting of $BaTiO_3$, $Pb(Zr,Ti)O_3$ (PZT), $Pb_{1-x}La_xZr_{1-y}Ti_yO_3$ (PLZT $0<x<1$, $0<y<1$), $Pb(Mg_{1/3}Nb_{2/3})O_3$—$PbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$ particles, and mixtures thereof.

7. The method according to claim 5, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$). lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) particles, and mixtures thereof.

8. The method according to claim 1, wherein the first binder polymer is a polymer having cyano groups.

9. The method according to claim 8, wherein the polymer having cyano groups is selected from the group consisting of cyanoethylpullulan, cyanoethyl polyvinyl alcohol, cyanoethyl cellulose, polycyanoacrylate, cyanoethyl sucrose and mixtures thereof.

10. The method according to claim 1, wherein the first binder polymer is polyacrylamide-co-acrylate.

11. The method according to claim 1, wherein the solvent has a solubility parameter difference of 5.0 $Mpa^{0.5}$ or less from those of the first binder polymer and the second binder polymer.

12. The method according to claim 11, wherein the solvent is selected from the group consisting of acetone, N,N-dimethylacetamide, N,N-dimethylformamide, N-methyl-2-pyrrolidone, methyl ethyl ketone and mixtures thereof.

13. The method according to claim 1, wherein the second binder polymer is selected from the group consisting of polyvinylidene fluoride-co-hexafluoropropylene, polyvinylidene fluoride-co-trichloroethylene, polymethyl methacrylate and mixtures thereof.

14. The method according to claim 1, wherein the difference in solubility parameter between the non-solvent and the second binder polymer is 8.0 $Mpa^{0.5}$ or more.

15. The method according to claim 14, wherein the non-solvent is selected from the group consisting of water, methanol, ethanol and mixtures thereof.

16. The method according to claim 1, wherein the first binder polymer and the second binder polymer is in a weight ratio of 75:25 to 10:90.

17. The method according to claim 1, wherein the inorganic particles and the binder polymers is in a weight ratio of 50:50 to 99:1.

18. A separator manufactured by the method according to claim 1.

19. A method for manufacturing an electrochemical device, the method comprising interposing a separator manufactured by the method according to claim 1 between a cathode and an anode, followed by lamination.

20. The method according to claim 19, wherein the electrochemical device is a lithium secondary battery.

* * * * *